US010443017B1

(12) United States Patent
Bleyer

(10) Patent No.: US 10,443,017 B1
(45) Date of Patent: Oct. 15, 2019

(54) PROCESS AND METHOD FOR THE RECOVERY OF OIL FROM THE PROCESSING OF GRAINS INTO BIOFUELS AND OTHER CHEMICALS

(71) Applicant: Trucent, Dexter, MI (US)

(72) Inventor: James Robert Bleyer, Maumee, OH (US)

(73) Assignee: Trucent, Inc., Dexter, MI (US)

( * ) Notice: Subject to any disclaimer, the term of this patent is extended or adjusted under 35 U.S.C. 154(b) by 0 days.

(21) Appl. No.: 16/252,906

(22) Filed: Jan. 21, 2019

(51) Int. Cl.
*C11B 3/16* (2006.01)
*C11B 13/00* (2006.01)
*B01D 11/04* (2006.01)
*B01D 21/26* (2006.01)
*B01D 37/00* (2006.01)

(52) U.S. Cl.
CPC .......... *C11B 3/16* (2013.01); *B01D 11/04* (2013.01); *B01D 21/262* (2013.01); *B01D 37/00* (2013.01); *C11B 13/00* (2013.01)

(58) Field of Classification Search
CPC ... A23D 9/00; A23D 9/02; B01D 1/00; B01D 1/26; B01D 3/00; B01D 11/00; B01D 11/04; B01D 17/00; B01D 17/02; B01D 17/04; B01D 21/00; B01D 21/01; B01D 21/26; B01D 21/262; B01D 37/00; B01D 37/02; B02B 1/00; B02B 9/00; B03B 9/00; B03D 1/00; B03D 1/001; B03D 1/018; B03D 3/00; B04C 5/00; C01B 3/00; C01B 3/02; C02F 1/00; C02F 1/38; C02F 1/40; C02F 1/52; C02F 2103/32; C02F 2303/10; C07C 31/00; C07C 31/02; C07C 31/08; C08L 171/00; C08L 171/02; C08L 2205/00; C08L 2205/02; C08L 2205/25; C11B 1/00; C11B 1/02; C11B 1/04; C11B 1/10; C11B 1/108; C11B 3/00; C11B 3/001; C11B 3/006; C11B 3/02; C11B 3/06; C11B 3/16; C11B 13/00; C12M 1/00; C12M 1/12; C12F 3/00; C12F 3/10; C12F 3/02; C12P 7/00; C12P 7/02; C12P 7/04; C12P 7/06; C12P 7/08; C12P 7/10; C12P 7/14; C12P 7/16; C12P 7/64; C12P 7/6436; C12P 7/6445; C12P 7/6463; C12P 7/649;

(Continued)

(56) References Cited

U.S. PATENT DOCUMENTS 3,950,365 A * 4/1976 Singer .................. C07C 51/47
554/187
4,702,798 A * 10/1987 Bonanno ................. B01D 1/26
159/17.1

(Continued)

FOREIGN PATENT DOCUMENTS

WO     2006102685     9/2006

*Primary Examiner* — Joseph W Drodge
(74) *Attorney, Agent, or Firm* — Kohn & Associates, PLLC

(57) ABSTRACT

A method of recovering an extraction aid from distillers corn oil, by directing stillage containing distillers oil and an extraction aid to a centrifugal separator, recovering a light phase from the centrifugal separator, the light phase containing at least a portion of the distillers oil and at least a portion of the extraction aid, cooling the light phase and causing a precipitate to form, and recovering a precipitate from the cooled light phase containing at least a portion of the extraction aid. A method of recovering distillers oil.

16 Claims, 4 Drawing Sheets

(58) Field of Classification Search
CPC ........... A23J 1/12; A23K 10/26; A23K 10/38; A23K 40/25; A23L 33/115; B02C 9/00; B02C 9/04; B04B 1/00; B04B 1/20; B04B 2001/205; B04B 3/00; B04B 3/04; B04B 5/10; C07K 1/14; C07K 1/36; C10G 2300/00; C10G 2300/10; C10G 2300/1011; C10G 2300/1014; C10K 1/002; C10K 1/003; C10K 1/004; C10K 3/02; C10K 3/023; C10K 3/04; C10L 11/02; C10L 11/026; C10L 11/1802; C10L 2200/0484; C10L 2290/14; C10L 2290/141; C10L 2290/544; C11C 1/08; C11C 1/005; C11C 3/003; C11C 3/08; Y02E 50/00; Y02E 50/10; Y02E 50/13; Y02E 50/16; Y02E 50/17; Y02E 50/30; Y02E 50/34; Y02E 50/343; Y02P 30/00; Y02P 30/20; Y02P 60/80; Y02P 60/87; Y02W 30/50; Y02W 30/74; Y10S 159/00; Y10S 159/08

USPC .................. 44/308, 605; 159/6.1, 17.3, 47.3; 202/81, 82, 152, 163, 168, 169; 209/2, 209/729; 210/173, 600, 767, 768, 770, 210/787, 790, 512.1, 804, 806, 195.1, 210/259, 702; 252/61, 182.32, 372, 373; 422/255; 435/71.1, 72, 41, 132, 134, 435/161, 162, 163, 164, 167, 291.1; 426/624, 472; 494/37; 530/350, 427; 554/1, 8, 9, 12, 19, 204, 840; 585/16

See application file for complete search history.

(56) References Cited

U.S. PATENT DOCUMENTS

| | | | |
|---|---|---|---|
| 8,008,517 B2 | 8/2011 | Cantrell et al. | |
| 8,227,015 B2 | 7/2012 | Bruinsma et al. | |
| 8,841,469 B2 | 9/2014 | Shepperd et al. | |
| 9,328,311 B2* | 5/2016 | Jenkins | C11B 13/00 |
| 9,353,332 B2 | 5/2016 | Lewis | |
| 9,738,850 B1 | 8/2017 | Wiese | |
| 9,828,568 B2 | 11/2017 | Wang et al. | |
| 10,081,779 B2 | 9/2018 | Wang et al. | |
| 2009/0118477 A1* | 5/2009 | Hallberg | B01D 3/002 530/500 |
| 2010/0331580 A1 | 12/2010 | Ridgley | |
| 2011/0283602 A1* | 11/2011 | Gallop | C11B 3/08 44/307 |
| 2012/0156738 A1* | 6/2012 | Anton | B01D 3/002 435/135 |
| 2013/0344554 A1* | 12/2013 | Bleyer | B01D 3/14 435/161 |
| 2014/0017728 A1* | 1/2014 | Bleyer | B01D 3/14 435/71.1 |
| 2014/0135515 A1* | 5/2014 | Dasari | C11B 3/04 554/212 |
| 2014/0155639 A1* | 6/2014 | Sticklen | C11B 13/00 554/13 |
| 2014/0273108 A1* | 9/2014 | Bleyer | C12P 19/14 435/99 |
| 2014/0343259 A1* | 11/2014 | Bleyer | A23J 1/006 530/414 |
| 2015/0184112 A1* | 7/2015 | Lewis | C11B 1/10 554/10 |
| 2015/0196482 A1* | 7/2015 | Bleyer | A61K 8/922 424/59 |
| 2015/0238881 A1* | 8/2015 | Bleyer | B01D 3/14 435/161 |
| 2015/0284659 A1 | 10/2015 | Young | |
| 2015/0305370 A1* | 10/2015 | Bleyer | A23K 10/38 435/71.2 |
| 2016/0160151 A1 | 6/2016 | Sungail | |
| 2017/0175032 A1 | 6/2017 | Murphy et al. | |

* cited by examiner

PROCESS AND METHOD FOR THE RECOVERY OF OIL FROM THE PROCESSING OF GRAINS INTO BIOFUELS AND OTHER CHEMICALS

BACKGROUND OF THE INVENTION

1. Technical Field

The present invention relates to methods of recovering oil from grains, seeds and other sources. More specifically, the present invention relates to methods of recovering and reusing extraction aids to improve the oil recovery from by-products of grain fermentation.

2. Background Art

Demand for bio-based products has risen in recent years, driven by increase in consumer demand for more sustainable, environmentally benign chemicals. Bio based products include chemicals and biofuels derived from the fermentation of sugars. Ethanol, for example, is a biofuel produced by the fermentation of sugars into ethyl alcohol. The sugars can be derived from simple sugars, starch, hemi-cellulose and cellulose. In the United States, most ethanol is produced from corn in a dry mill process, however any suitable feedstock can be used.

In a typical dry mill ethanol plant, grain is ground and mixed with water to form a slurry. Enzymes are added to convert the complex sugars in the mash to simple sugars that are then fermented, typically using the yeast *saccharomyces cerevisiae*, to produce a beer of about 12%-14% w/w alcohol. Alcohol is stripped from the beer, purified, and dehydrated. The residue from this process, referred to as whole stillage, is a complex mixture of soluble and insoluble components such as proteins, fiber, oil, yeast bodies, and off-product yeast metabolites. The whole stillage is centrifugally separated into two streams; a first stream containing larger and heavier insoluble particles, referred to as wet cake, and a second stream referred to as thin stillage containing smaller, lighter soluble and insoluble components, such as proteins, yeast bodies, organic acids, glycerol, residual sugars, oil, and oil containing particles. A portion of the thin stillage is typically directed to the front end of the ethanol production as make up water, referred to as backset. The remainder of the thin stillage is concentrated into a syrup by evaporation. Alternatively, solids can be removed from the thin stillage by, for example, filtration or centrifugation, resulting in a stillage stream of high solids referred to as syrup, and a stillage stream of low solids referred to as clarified stillage The oil in the stillage, referred to as distillers oil, has become an important co-product of the process and much attention has been directed to economical and effective methods to recover it.

The predominate technology for the recovery of distillers oil from dry mill ethanol is high speed centrifugal separation. The centrifugal separation of particles in a suspension via gravitational force can be approximated from Stoke's equation:

$$V = D^2(r_p - r_L) \times g/(18h)$$

Where V=the separation velocity of a spherical particle in a medium
D=diameter of the sphere
$r_p$=particle density (oil droplet)
$r_L$=liquid medium density (stillage)
h=viscosity of the medium
g=gravitation force applied Important behaviors of a particle in suspension can be ascertained from Stoke's equation. The separation velocity can be increased by increasing the diameter of the particle, increasing the relative density difference between the particle and the medium, increasing the applied g-force and decreasing the viscosity of the medium. Process inputs to ethanol production, such as mechanical and thermal energy, chemicals and enzymes can affect these factors. The separation efficiency can be calculated by dividing the centrifugally recovered oil by the total amount of oil present in the feed. Increasing the separation velocity as estimated by Stoke's equation can increase the separation efficiency.

Recent advancements in processing technologies and fiber conditioning, referred to as "Generation 1.5 processing", have allowed the conversion of the cellulose and/or hemicellulose portion of the grain and/or seed to simple sugars. These simple sugars can be fermented to an alcohol, either together with starch-derived sugars or in a separate fermentation process. Any suitable technology can be used to convert the fibers to simple sugar, such as regrinding or milling. Fiber conditioning may include enzyme treatment, acid treatment, base treatment, thermal conditioning, or any other suitable technology. Fiber conditioning can be used in conjunction with processing technologies.

Generation 1.5 processing can have a deleterious effect on the recovery of oil. For example, byproducts may be created that act as binders and emulsifiers. The various streams can have increased viscosities, inhibiting oil recovery.

In a seed or grain, oil is stored as small vesicles known as oil bodies. In maize, for example, oil bodies have a diameter of less than 1 micrometer to several micrometers. Coalesce of the oil bodies is prevented by a stabilizing matrix of phospholipids and proteins located on the oil body surface. The phospholipid and protein matrix inhibit the ability of the individual oil bodies to coalesce and form the larger oil droplets required for centrifugal separation. During the ethanol process, some of these matrices are degraded, releasing oil from the oil bodies. Various enzymes, such as protease and cellulase, can be added at various points in the process to increase the degradation of the matrix. However, this can increase the viscosity of the stillage thereby decrease the separation velocity.

Emulsifiers are molecules that have a charged hydrophilic head that dissolves in water and a hydrophobic tail, typically a long hydrocarbon, that dissolves in oil. Native emulsifiers, such as phospholipids, proteins and free fatty acids, are found in oil.

Recently, chemical extraction aids have gained wide use to increase the effectiveness of centrifugal devices to recover distillers oil. These extractions aids utilize various mechanisms to increase oil recovery, but in general, these aids enhance the coalescence of oil bodies thus increasing oil droplet size and thereby increasing separating velocity vis a vis Stoke's equation. The extraction aids are typically added to the feed of the centrifugal device at dosage rates of about 500 ppm. Emulsifiers are surface active compounds that can be effective extraction aids by drawing oil bodies from their protective matrix allowing separation by centrifugal force or any other suitable means. However, there are drawbacks to using these extraction aids. The cost of adding these chemical products is as high as 10% of the value of the oil. These aids can leave as much as 15% of the oil in the stillage unrecovered. Therefore, a more cost-effective method of increasing the recovery of oil is required.

SUMMARY OF THE INVENTION

The present invention provides for a method of recovering an extraction aid from distillers corn oil, by directing stillage containing distillers oil and an extraction aid to a separator, recovering a light phase from the separator, the light phase containing at least a portion of the distillers oil and at least a portion of the extraction aid, cooling the light phase and causing a precipitate to form, and recovering a precipitate from the cooled light phase containing at least a portion of the extraction aid.

The present invention further provides for a method of recovering distillers oil by directing stillage from an ethanol process containing distillers oil and one or more extraction aids to a centrifugal separator, separating the stillage into an oil enriched light phase and a heavy phase, cooling at least a portion of the light phase and causing a precipitate to form, recovering at least a portion of the precipitate from the cooled light phase, and recovering at least a portion of the distillers oil from the cooled light phase.

DESCRIPTION OF THE DRAWINGS

Other advantages of the present invention are readily appreciated as the same becomes better understood by reference to the following detailed description when considered in connection with the accompanying drawings wherein:

FIG. 4A is at 106.1 degrees F., FIG. 4B is a 95.1 degrees F., FIG. 4C is at 68.8 degrees F., and FIG. 4D is a 48.7 degrees F.

DETAILED DESCRIPTION OF THE INVENTION

Most generally, the present invention provides for methods of improving the extraction of oil from the stillage of a grain processing plant (such as a fermentation process that produces ethanol) through recovery of natural and added extraction aids from oil and recycling the natural and added extraction aids to the feed of a centrifugal separator.

Figure 1:
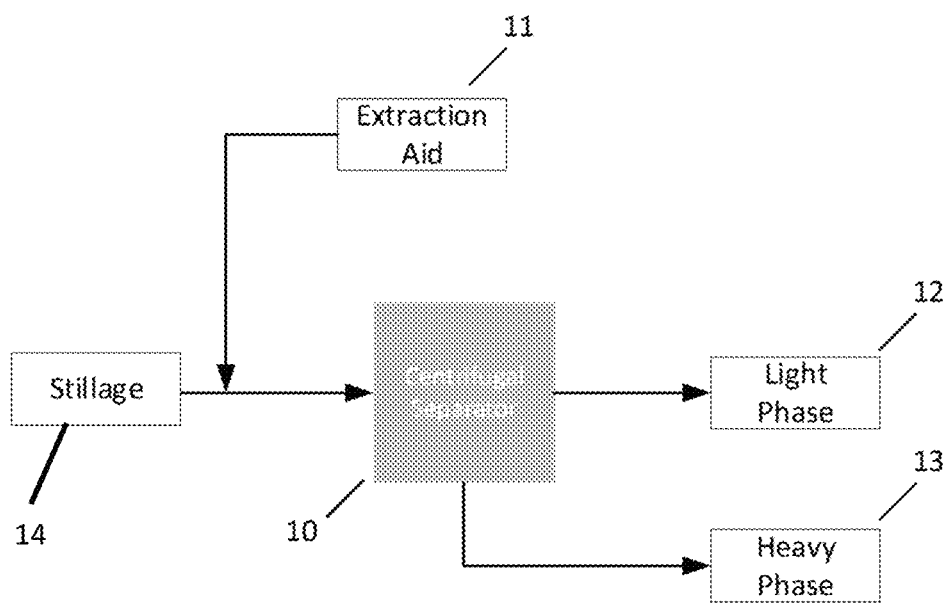
FIG. 1 is a process diagram of the prior art.

Referring to FIG. 1, in an oil recovery process of the prior art, stillage (14) from a fermentation process is directed to a centrifugal separator (10). An extraction aid (11) is added to the feed of the centrifugal separator (10). A light phase containing oil is recovered (12). A heavy phase of oil depleted stillage is recovered (13).

The extraction aid (11) can be one or more of any suitable compounds found to enhance the recovery of distillers oil. Examples of commercial oil extraction aids include various surface active chemical compounds such as lecithin (a phospholipid), alkoxylated modified corn oil, or alkoxylated polyols such as sucrose, sorbitol, sorbitan, isosorbide, glycerol or fatty esters thereof. The surface active chemical compounds may be formulated with other components including carrier oils, formulation viscosity modifiers such as water, glycerol, glycols and polyglycols, and silicon-based or metal oxide particulates. In general, commercial oil extraction aid formulations are added to the centrifuge stream at low levels ranging from 100 ppm to 10,000 ppm by weight. For example, in U.S. Patent Application Publication No. 2014/0171670 A1 "METHODS AND SYSTEMS FOR BO-OIL RECOVERY AND SEPARATION AIDS THEREFOR", Jenkins et al discloses a separation aid comprising at least one lecithin and at least one oil and optionally at least one surfactant having at least one surfactant having an HLB of at least 6. In WO2015057191A1, Turunc, et al discloses a separation aid comprising i) a non-ionic surfactant comprising a polyol derived from a sorbitol, a sorbitan, or isosorbide and ii) an ester of a polyethylene glycol and a fatty acid. In U.S. Patent Application Publication No. 20120245370 A1, Shepperd, et al discloses an extraction aid comprising a functionalized polyol derived from a sorbitol, a sorbitan, or isosorbide. In U.S. Pat. No. 10,081,779, Wang, et al. discloses a separation additive comprising a mixture of a fatty acid ester of alkoxylated polyol and a fatty ester of alkoxylated glycerol, wherein the polyol comprises greater than 3 carbon atoms.

The light phase (12) contains oil, lipid soluble compounds, water, alkali metals, phosphorus, magnesium, calcium and other chemical and additives from the ethanol process. The light phase (12) can also contain a portion of the extraction aid (11) added to stillage prior to centrifugation.

In the present invention it has been discovered for the first time that cooling the light phase (12) causes the extraction aid (11) to precipitate. In the present invention is has also been discovered for the first time that the precipitated extraction aid retains at least a portion of its activity and can be recycled to the stillage to improve oil recovery.

In a first embodiment, the present invention provides for a method of recovering an extraction aid from distillers corn oil, by directing stillage (14) containing distillers oil and an extraction aid (11) to a centrifugal separator (10), recovering a light phase from the centrifugal separator (12), the light phase (12) containing at least a portion of the distillers oil and at least a portion of the extraction aid (11), cooling (20) the light phase (12) and causing a precipitate to form (for example, by cooling to a temperature at or below about 120 degrees F., and more preferably, at or below 80 degrees F.), and recovering a precipitate (21) from the cooled light phase (12) containing at least a portion of the extraction aid (11).

Some components of the light phase (12) are hydrophilic with poor solubility in oil and it is counterintuitive that these components would preferentially partition to the light phase (12). However, also present in the light phase (12) are components that function as co-solvents enabling the sorption of hydrophiles, Free fatty acids are examples of co-solvents where a hydrophilic head is immersed in the surrounding water and a lipophilic tail form the core of a micelle. Recovery of the precipitate can be enhanced by interrupting the intermolecular forces between the co-solvent and the hydrophiles. For example, water could be added to the light phase (12) to form an aqueous phase, drawing the hydrophiles from the light phase (12) to the aqueous phase.

Figure 2:
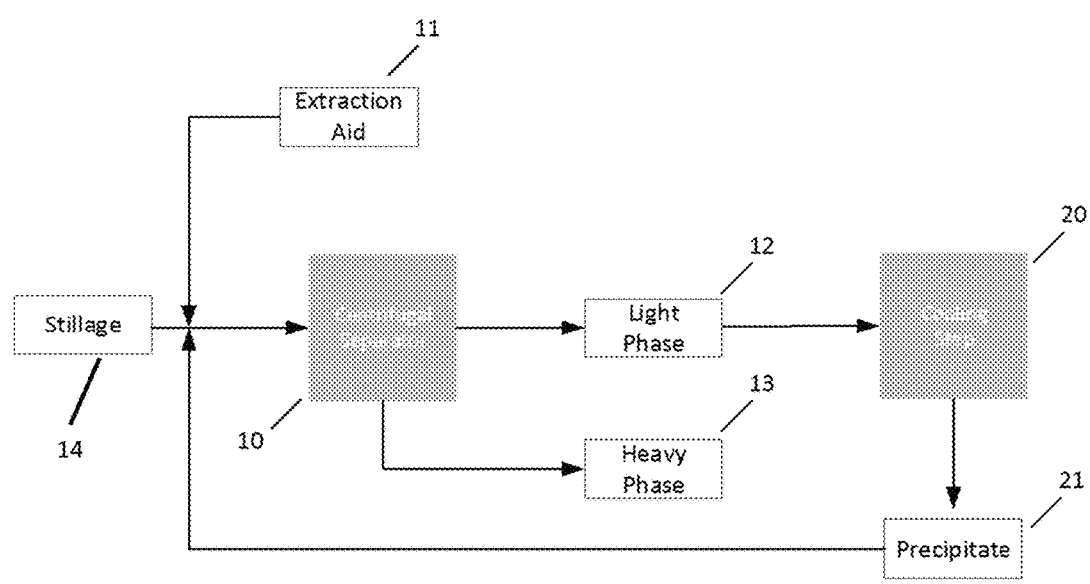
FIG. 2 is a process diagram of one embodiment of the present invention.

Referring to FIG. 2, in the first embodiment of the present invention, stillage (14) from a fermentation process is directed as a feed to a centrifuge (10). One or more of the following types of stillage (14) can be used: whole stillage, thin stillage, or concentrated thin stillage. A light phase containing oil is recovered (12) and collected from the centrifugal separator (10). A heavy phase containing oil depleted stillage is recovered (13). The light phase containing oil is cooled (20) to form a precipitate (21), and at least a portion of the precipitate (21) is added to the feed of a centrifuge (10) along with stillage (14). The light phase (12) is cooled (20) to a temperature at or below about 80 degrees F. and preferably at or below about 70 degrees F., causing the precipitate (21) to form.

The precipitate (21) can be separated from the light phase (12). A separation aid (11) can be added or recycled to the feed to a centrifuge (10). The precipitate (21) can contain at least a portion of the added separation aid (11). The precipitate (21) can include one or more of the following: phospholipids, magnesium and free fatty acids. Feed to the centrifuge (10) can be heated prior to centrifugation. The precipitate (21) can be heated prior to its addition to the feed.

Various methods can be used to separate the precipitate (21) from the light phase (12), such as, but not limited to, quiescent decantation, centrifugation, filtration, solvent extraction, or any other suitable means. Quiescent decantation is an effective means of recovering precipitate (21).

Some components may collect at the interfacial boundary of the light phase and the heavy phase of the separator, forming a middle phase. The partitioning of these components can be influenced by the operating parameters of the separator, such as directing the middle phase to the light phase of the separator, thereby increasing the amount of these components recovered from the light phase.

The method can further include the step of directing and recycling at least a portion of the recovered precipitate (21) to the feed of the centrifuge (10). At least a portion of the precipitate (21) directed to the feed of a centrifuge (10) partitions to the light phase (12) and, upon cooling, precipitates again. Therefore, continuous recycling of the precipitate (21) will cause the compounds in the precipitate (21) to build up in the feed. All or a portion of the precipitate (21) can be recycled until the desired level is reached and then a portion of the precipitate (21) can be bled off to maintain that desired level. In the case of fresh extraction aid (11), the fresh extraction aid (11) can be added at a desired dose, recovered as a precipitate (21), and recycled to the feed of a centrifugal separator (10). As the precipitate (21) builds up in the feed, the dose of the fresh extraction aid (11) can be gradually reduced. Therefore, one or more extraction aids (11) can be added to a feed of a centrifuge (10), recovered from the light phase (12) of a centrifuge (10) as a precipitate (21) and recycled to the centrifuge feed, reducing the need for addition of fresh extraction aid (11). The recycling step improves the separation efficiency of the centrifugal separator (10).

In a second embodiment, the present invention further provides for a method of recovering distillers oil (22) by directing stillage (14) from an ethanol process containing distillers oil and one or more extraction aids (11) to a centrifugal separator (10), separating the stillage (14) into an oil enriched light phase (12) and a heavy phase (13), cooling (20) at least a portion of the light phase (12) and causing a precipitate to form (such as cooling to a temperature at or below 120 degrees F., and more preferably, cooling to a temperature at or below 80 degrees F.), recovering at least a portion of a precipitate (21) from the cooled light phase (12), and recovering at least a portion of the distillers oil (22) from the cooled light phase (12). At this point, the method can repeat starting from the separating step. Preferably, the method also includes concentrating (30) at least a portion of the recovered precipitate (21), and directing at least a portion of the concentrated precipitate to a stream/feed containing stillage (14). The precipitate (21) contains at least a portion of the one or more extraction aids (11).

Oil and other compounds can be entrained with the precipitate (21) and dilute the precipitate (21). Additional processes may be employed to remove these diluent compounds and concentrate the precipitate (21). Concentration can effectively reduce the volume of precipitate needed for recycle to the feed of the oil recovery centrifuge. Some components of the precipitate, including the extraction aid, may be marginally soluble in oil; however, components that act as co-solvents are present which enhance solubility. Free fatty acids, carotenoids and phytosterols are examples of molecules that can act as co-solvents. In an embodiment of the invention, further concentration of the oil extraction aid is achieved by selective extraction with a properly selected solvent. Any suitable solvent can be used including a representative range of solvent polarities encompassing highly polar water to less polar alcohols to non-polar hydrocarbons and combinations thereof. Solvent may be removed by for example evaporation prior to recycling of the concentrated precipitate.

It should also be understood that the concentrating and recycling steps can be performed in the first embodiment as well.

Figure 3:
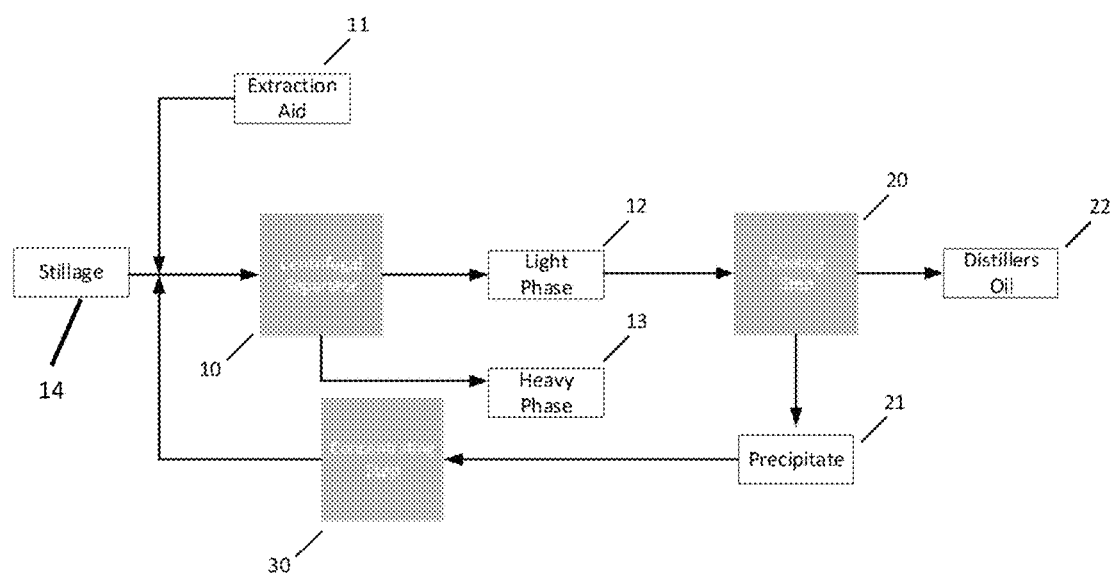
FIG. 3 is a process diagram of another embodiment of the current invention.
Figures 4A, 4B, 4C, 4D:
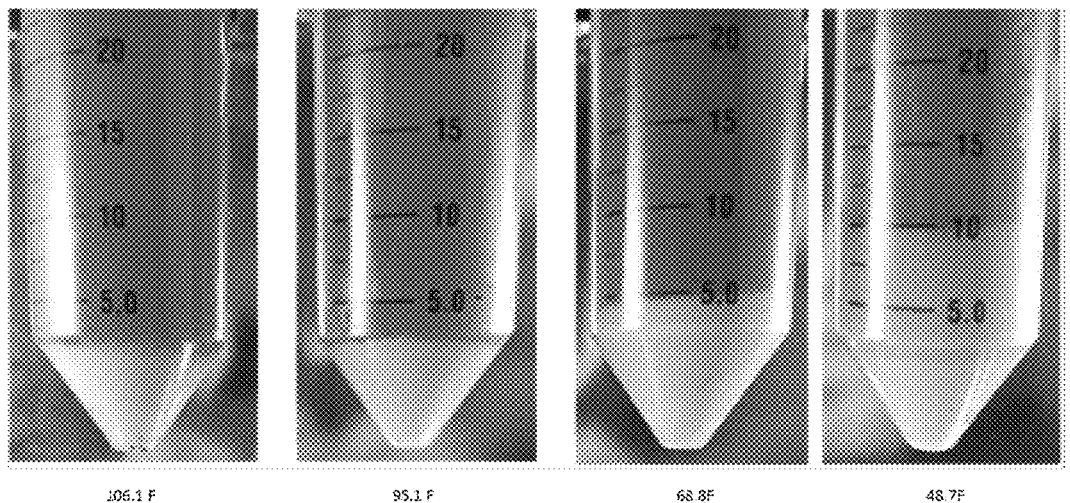
FIGS. 4A-4D are photographs of a distillers oil cooled to various temperatures, then centrifuged.

Referring to FIG. 3, in the second embodiment of the present invention, the precipitate (21) is further concentrated (30) prior to adding to the feed of a centrifuge (10). The steps of the method are as described above in the first embodiment. The precipitate (21) can be further concentrated by a method such as, but not limited to, centrifugation, filtration, solvent extraction, and combinations thereof. Solvents are broadly interpreted to include organic solvents as well as mixtures of water and organic solvents. The distillers oil (22) can be recovered by any suitable method from the cooled light phase (12), and can be left over from the separation of the precipitate (21).

In any of the methods herein, whole stillage can be separated into wet cake and thin stillage by one or more of the following methods: centrifugation, filtration, or any other suitable means. The stillage can be concentrated before entering the centrifuge (10). The thin stillage can be concentrated to a syrup by one or more of the following methods: evaporation, filtration, dissolved air flotation, or any other suitable means, and by combinations thereof. The syrup is maintained at a temperature between about 150 and 200 degrees F. The filtration or flotation of the thin stillage is aided by the addition of one or more of the following: filter aid, coagulant, or flocculant. Feedstock to the fermentation process producing the stillage can be one or more of corn and milo.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

Example 1

Precipitate Volume Vs Oil Temperature

Procedure

Distillers oil was obtained from a commercial ethanol facility and transferred to 50 ml conical tubes. The tubes were then placed in water baths to cool the distillers oil under quiescent conditions. The temperature of oil was recorded and then the conical tubes were centrifuged at 3000× gravity for 5 minutes.

Discussion of Results:

The volume of precipitate was observed and recorded (Table 1). Photographs of the cooled, centrifuged oil were taken (FIGS. 4A-4D).

TABLE 1

| Temperature (degrees F.) | Precipitate Volume (ml) |
|---|---|
| 48.7 | 10 |
| 68.8 | 5 |
| 95.1 | 3 |
| 106.1 | 3 |

Example 2

Analysis of Precipitate

Procedure

Distillers oil was obtained from a commercial ethanol facility and cooled to a temperature of about 60 degrees F. The oil was allowed to quiescently separate into a supernatant and a precipitate. Samples of the initial distillers oil, isolated supernatant, and isolated precipitate were analyzed for phosphorus, magnesium, and the presence of polysorbate 80.

Method of Analysis

The magnesium content was analyzed using AOCS method EN 14538. The phosphorus content was analyzed using AOCS method D 4951. A Matrix Assisted Laser Desorption/Ionization Time of Flight mass spectrometer (MALDI TOF) was used to detect the presence or absence of polysorbate 80.

Discussion of Results

The results of the analysis are shown in TABLE 2.

TABLE 2

| SAMPLE | P (ppm) | Mg (ppm) | Polysorbate 80 |
|---|---|---|---|
| Distillers Oil | 15.7 | 1.7 | Present |
| Supernatant | 3.3 | 0.2 | Absent |
| Precipitate | 67.4 | 3.5 | Present |

Cooling the distillers oil partitioned a majority of the phosphorus and magnesium to the precipitate. All of the Polysorbate 80 partitioned to the precipitate as it was detected in the distillers oil and in the precipitate, but not in the supernatant.

Example 3

Effectiveness of Precipitate as an Extraction Aid

Procedure

Post evaporator syrup was obtained from a commercial ethanol plant and heated to 90 degrees C. Precipitate from Experiment 2 was added to the syrup at a dosage of 500 ppm, 1000 ppm, 2000 ppm, and 5000 ppm as measured by weight of precipitate/weight of syrup. Syrup with no precipitate was prepared as a control. A sixth sample was prepared by adding 1000 ppm of the original distillers oil to the stillage as measured by weight of oil/weight of syrup. The samples were transferred to 50 ml Babcock tubes and centrifuged at 3000x the force of gravity for 5 minutes. The free oil release was volumetrically measured in the neck of the Babcock tube.

Discussion of Results

The results of EXAMPLE 3 are tabulated in TABLE 3.

TABLE 3

| Treatment Additive | Oil release (ml oil/50 g syrup) |
|---|---|
| None (Control) | 0.044 |
| 500 ppm Precipitate | 0.753 |
| 1000 ppm precipitate | 1.157 |
| 2000 ppm precipitate | 1.618 |
| 5000 ppm precipitate | 1.864 |
| 1000 ppm Distillers Oil | 0.042 |

Adding the precipitate improved the release of oil from syrup as compared to the control. The addition of 5000 ppm w/w of precipitate released 42 times more oil than the control. The inclusion of a treatment with 1000 ppm distillers oil serves two purposes in the experiment. First, the improvement in extraction is attributed to the compounds concentrated in the distillers oil precipitate and not the distillers oil nor unconcentrated components of the distillers oil. Secondly, the improvement in extraction is a result of the release of oil contained within the syrup and not simply the recovery of the added oil.

The recovery of oils is ubiquitous and can be applied to a variety of seeds, such as olive, avocado, rapeseed, soybean, sunflower, walnut or any other suitable source. Algae can be a biological source of oil and may be recovered. Tall oil, a by-product of the Kraft wood pulping process, milk fats, animal fats and fish oils are examples of oils that may be recovered. Any suitable means may be used to recover the oil, including, but not limited to, cold pressing, cooking, and solvent extraction. The unexpected results from the experiments can be used to form a basis of design for an extraction aid recycling process that can be applied to any mixture containing an oil or an emulsion of oil, especially mixtures containing dissolved and suspended solids. With respect to fermentation stillage, the invention can be applied in various iterations. Therefore, in one embodiment of the present invention, a stream containing an extraction aid (11) and an oil is directed to a separator (10) and at least a portion of the oil and a portion of the extraction aid is separated from the stream as a separated oil and extraction aid phase (12). A precipitate (21) can be recovered from the separated oil and extraction aid phase (12). The precipitate (21) can be directed to the feed of a separator (10). The oil can be, but is not limited to, olive oil avocado oil, rapeseed oil, soybean oil, sunflower oil, walnut oil, algae oil, tall oil, milk fats, animal fats, fish oil or any suitable oil. The separator (10) can be, but is not limited to, a centrifuge, decanter, press, extruder, solvent extractor, or any suitable separator.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A method of recovering an extraction aid from distillers corn oil, including the steps of:
   directing concentrated thin stillage containing distillers oil and an extraction aid to a centrifugal separator;
   recovering a light phase from the centrifugal separator, the light phase containing at least a portion of the distillers oil and at least a portion of the extraction aid;
   cooling the light phase and causing a precipitate to form; and
   recovering the precipitate from the cooled light phase containing at least a portion of the extraction aid.

2. The method of claim 1, further including a step of directing and recycling at least a portion of the recovered precipitate to a feed of the centrifugal separator.

3. The method of claim 2, wherein a feed to the centrifugal separator contains the concentrated thin stillage.

4. The method of claim 2, wherein said recycling step improves the efficiency of distillers oil separation in the centrifugal separator as compared to separation without recycling.

5. The method of claim 1, wherein said cooling step is further defined as cooling the light phase to a temperature between 48.7 degrees F. and 106.1 degrees F.

6. The method of claim 1, wherein the concentrated thin stillage is from a fermentation process that produces ethanol.

7. The method of claim 1, wherein a feedstock to a fermentation process producing the concentrated thin stillage is one or more of corn and milo.

8. The method of claim 1, further including a step of concentrating the thin stillage before said directing step.

9. The method of claim 8, wherein said concentrating step is performed by a method chosen from the group consisting of evaporation, filtration, dissolved air flotation, and combinations thereof.

10. The method of claim 1, further including a step of concentrating the precipitate prior to directing at least a portion of concentrated precipitate to a feed of the centrifuge.

11. The method of claim 10, wherein said concentrating step is performed by a method chosen from the group consisting of centrifugation, filtration, solvent extraction, and combinations thereof.

12. A method of recovering distillers oil, including the steps of:
   directing concentrated thin stillage from an ethanol process containing distillers oil and one or more extraction aids to a centrifugal separator;
   separating the concentrated then stillage into an oil enriched light phase and a heavy phase;
   cooling at least a portion of the light phase and causing a precipitate to form;
   recovering at least a portion of the precipitate from the cooled light phase;
   and recovering at least a portion of the distillers oil from the cooled light phase.

13. The method of claim 12, wherein the precipitate contains at least a portion of the one or more extraction aids.

14. The method of claim 12, wherein said cooling step is further defined as cooling the light phase to a temperature between 48.7 degrees F. and 106.1 degrees F.

15. The method of claim 12, further including a step of concentrating at least a portion of the precipitate.

16. The method of claim 12, further including a step of directing at least a portion of the recovered precipitate to the centrifugal separator feed wherein the feed contains the concentrated thin stillage.

* * * * *